Patented July 25, 1950

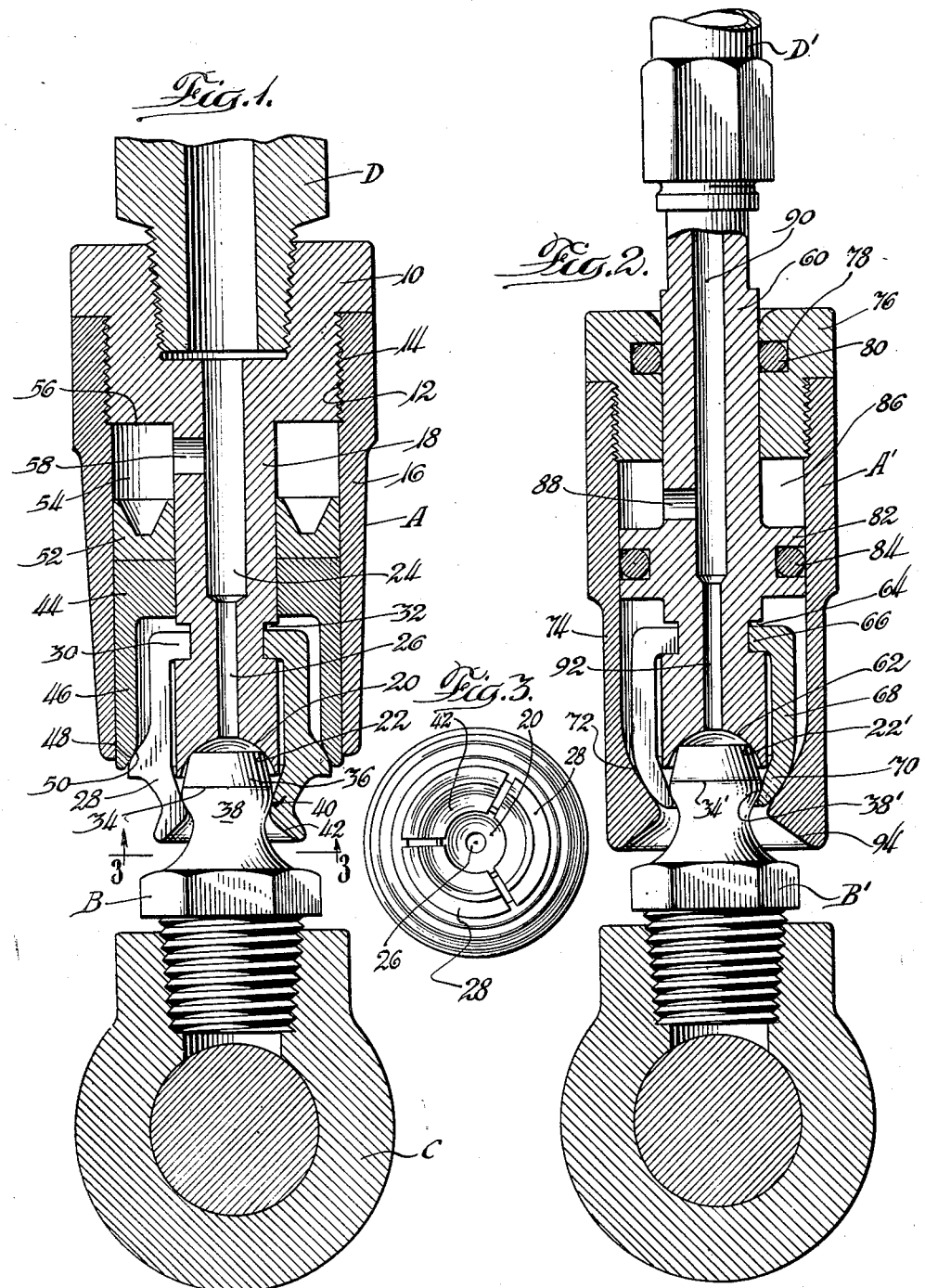

2,516,758

UNITED STATES PATENT OFFICE 2,516,758

COUPLER FOR LUBRICATING APPARATUS

Ernest W. Davis, River Forest, Ill.

Application July 23, 1947, Serial No. 763,130

5 Claims. (Cl. 285—168)

My invention relates to couplers for lubricating apparatus, and is more particularly concerned with couplers of the hydraulically operated type.

An object of my invention is to provide a new and improved coupler.

Another object of my invention is to provide a new and improved hydraulic coupler particularly adapted for lubricating apparatus but capable of other uses.

Another object of my invention is to provide a coupler having new and improved means for guiding the coupler in its application to a lubricant receiving fitting or nipple.

Another object of my invention is to provide a coupler which forms a metal to metal seal with the lubricant receiving fitting when the coupler is held at various angles relative to the axis of the fitting and which has flaring means for guiding the coupler in its application to the fitting.

Another object of my invention is to provide a coupler having novel guiding and camming means for facilitating the application of the coupler to and removal of the coupler from a lubricant receiving fitting or other fluid receiving member.

Another object of my invention is to provide a novel coupler having the foregoing advantages and wherein the sealing means and clamping means have no appreciable longitudinal movement relative to the conduit through which lubricant is supplied to the coupler.

Other objects and advantages will become apparent as the description proceeds.

In the drawing:

Fig. 1 is a longitudinal sectional view through a preferred embodiment of my invention showing it applied to a lubricant receiving fitting attached to a bearing, the bearing also being shown in section;

Fig. 2 is a view similar to Fig. 1 but showing a modified form of my invention; and Fig. 3 is a transverse sectional view taken on the line 3—3 of Fig. 1 looking in the direction of the arrows indicated on that figure.

Referring particularly to Fig. 1, it will be seen that I have illustrated therein a coupler indicated generally by "A" attached to a fitting "B" threaded into a bearing part "C," the coupler and bearing part being shown in sectional elevation whereas the fitting is illustrated in side elevation. It will be understood, however, that the fitting is provided with the usual passageway establishing communication between the coupler A and the bearing C when the parts are connected as shown. The passageway in the fitting may be provided with a check valve in accordance with the usual custom or such check valve may be omitted, as desired.

The coupler A has a base 10 threadedly attached to a conduit D which may be the flexible or rigid discharge conduit of a hand operated or power operated lubricant compressor, or of any other source of lubricant or fluid, or like material under pressure. The base 10 is provided with threads 12 engaging the complementary threads 14 of a coupling sleeve 16. The base 10 is also provided with a forwardly projecting and centrally located tubular extension 18 terminating in a concavely spherical sealing surface 20 adapted to engage the annular edge 22 provided by the inlet end of the fitting B. It will be understood that the fitting B and base part 10 of the coupler are preferably formed of metal so that a metal to metal seal is provided between the coupler and the fitting.

Lubricant or other material delivered to the coupler through the conduit D flows lengthwise of the coupler through passageways 24 and 26 and thence through the fitting B to the bearing part C. The pressure of the lubricant acting on the head of the fitting and the sealing surface 20 of the coupler produces forces which tend to separate the coupler and fitting. In my invention, separation of these parts during the lubricating operation is prevented by jaws 28 having in-turned ends 30 engaging a groove 32 in the extension 18. As shown in Fig. 3, three jaws are preferably provided although my invention is not limited to the use of three jaws and a different number of jaws may be used if desired.

Fitting B is of the headed type, the maximum diameter of the head being indicated at 34. Above this maximum diameter 34 is a frusto-conical portion 36 and below this maximum diameter is a spherical portion 38 adapted to be contacted by the fitting engaging portions 40 of the jaws 28. The lower ends of the jaws 28 have flaring portions 42 which serve to guide the coupler as it is applied to the fitting and which can also be used to cam the coupler off the fitting in a manner which is hereinafter described.

The jaws 28 are moved into gripping engagement with the fitting and are held in such engagement during the lubricating operation by a piston 44 located in the annular space between the extension 18 and the lower end of the sleeve 16. This piston has an annular jaw-operating extension 46 terminating in an inclined or frusto-conical surface 48 adapted to engage the annular and transversely rounded surface 50 of the jaws 28. An annular flexible washer 52 of synthetic rubber or other suitable material is located above the piston 44 to prevent leakage of lubricant therepast.

An annular chamber 54 is located between the washer 52 and the shoulder 56 provided by the base 10. Lubricant enters this annular chamber 54 by way of a branch passage 58 connecting the chamber with the passageway 24. The lubricant pressure in the chamber 54 varies with the lubricant pressure between the head of the fitting and the sealing surface 20 so that the force acting on the jaws 28 to hold them in gripping engagement with the fitting is always proportional to the force tending to separate the coupler and fitting. Since the fitting engaging portions of the jaws contact the fitting below the maximum diameter of the head, no frictional grip between the jaws and fitting is necessary to prevent the coupler from being forced off the fitting. The coupler will remain attached to the fitting as long as the lower ends of the jaws do not separate enough to permit the maximum diameter 34 of the head to pass through the restricted fitting-engaging portions of the jaws. The contact between the jaws and fitting, therefore, may be relatively frictionless to permit easy swivelling of the coupler about the axis of the fitting.

The operation of the coupler shown in Figs. 1 and 3 is as follows: when the coupler is first brought into engagement with the fitting, the flaring portion 42 of the jaws guides the coupler so that these jaws slip easily over the head of the fitting. During this operation of applying the coupler to the fitting, there is no lubricant pressure in the coupler and the lower ends of the jaws are free to separate to admit the fitting.

As soon as lubricant pressure is admitted to the coupler, this pressure acts upon the washer 52 and piston 44 to move these parts downwardly as shown in the drawing and thereby bring the fitting engaging portions of the jaws into contact with the rounded portion 38 of the fitting head beneath the maximum diameter thereof. The passageway 26 is of smaller diameter than the passageway 24 and branch 58 so that the lubricant pressure between the head of the fitting and the sealing surface 20 builds up more slowly than does the lubricant pressure behind the piston. In this way the jaws are caused to grip the fitting and hold the edge 22 in sealing engagement with the sealing surface 20 before any appreciable leakage of lubricant can take place between the coupler and fitting. Since the concavely spherical sealing surface 20 is rigid with the conduit D and coupler sleeve 16, manual force can be exerted to hold this sealing surface in engagement with the fitting prior to the introduction of lubricant pressure into the coupler if such manual sealing is desired.

After the coupler has been attached to the fitting in lubricant tight relation thereto, the lubricant flows through passageways 24 and 26 and fitting B into the bearing part C. When the desired amount of lubricant has been supplied to the bearing part, the lubricant pressure in the coupler is preferably released so that the coupler can be readily removed from the fitting by a straight pull or jerk. During such removal the lower ends of the jaws are spread apart to permit passage of the largest part of the head of the fitting and such spreading apart of the jaws creates a backward or upward movement of the piston 44 and washer 52.

If any appreciable lubricant pressure exists in the coupler when it is desired to remove this coupler from the fitting, the coupler can be cammed off of the fitting by pivoting the coupler about the head of the fitting until the lower end of one of the jaws engages the side of the fitting and pushes or cams the piston backwardly against the lubricant pressure. The flaring lower ends of the jaws, therefore, perform two functions; one, guiding the coupler onto the fitting during application of the coupler thereto, and two, camming the piston backwardly to release the jaws during the removal operation.

In the modified form of my invention shown in Fig. 2, the coupler A' has a central tubular member 60 threaded or otherwise suitably attached to a discharge conduit D'. The other end of the tubular member 60 is provided with a concavely spherical sealing surface 62 adapted to engage the edge 22' of the fitting B' which may be of the same construction as the fitting B shown in the previous embodiment. The tubular member 60 is also provided with an annular groove 64 adapted to receive the in-turned upper ends 66 of the jaws 68 whose lower ends 70 are tapered inwardly and engage the spherical portion 38' immediately beneath the maximum diameter 34' of the fitting head. As in the previous embodiment, three jaws are preferably provided, although the number of jaws is optional.

The lower ends 70 of the jaws are brought into engagement with the fitting by the inwardly tapered or frusto-conical portion 72 of a cylinder 74 movable with respect to the tubular member 60. This cylinder 74 is threadedly attached to a head 76 slidably engaging the tubular member 60. The head 76 has an annular recess 78 containing an annular gasket 80 of synthetic rubber or other suitable material. This gasket is preferably of the type commonly referred to as an O-ring.

The tubular member 60 has a piston-like portion 82 recessed to receive a second O-ring 84 for making a sliding sealed connection with the inner wall of the cylinder 74. An annular chamber 86 is located between the head 76 and piston-like portion 82. This chamber communicates with the discharge conduit D' through passageways 88 and 90. A smaller passageway 92 connects the passageway 90 with the sealing surface 62 and inlet end of the lubricant receiving fitting. The extreme lower end of the cylinder 74 is provided with an outwardly flaring part 94 which serves to guide the coupler onto the fitting.

In applying this form of my invention to the fitting, the cylinder 74 may be grasped and moved to bring the flaring part 94 thereof in contact with the end of the fitting, whereupon this flaring portion will guide the coupler over the head of the fitting. Since there ordinarily would be no lubricant pressure in the coupler at this time, the tubular member 60 and jaws 68 are free to move backwardly or away from the fitting so that no gripping or sealing action is effected until the lubricant pressure is applied. As soon as lubricant pressure is applied, this pressure acting in the annular chamber 86 causes a relative movement between the tubular member 60 and cylinder 74 whereby the jaws 68 and sealing surface 62 are brought into clamping and sealing engagement with the head of the fitting. Because the passageway 92 offers resistance to the flow of lubricant therethrough, this gripping and sealing action occurs before any appreciable amount of lubricant has been discharged through the passageway 92.

In lieu of gripping the cylinder 74 to apply the coupler of Fig. 2, the operator can grip the conduit D' or the end of the tubular member 60 attached thereto. As the coupler is brought into engagement with the end of the fitting, the flaring part 94 of the cylinder 74 will guide the coupler onto the fitting. If the cylinder 74 is in such a position that the gripping ends of the jaws are not separated sufficiently to admit the maximum diameter 34' of the fitting head, the application of the coupler to the fitting will cause the rounded external surfaces of these jaws to press against the frusto-conical surface 72 of the cylinder 74 and produce a relative movement between this cylinder and the jaws. This relative movement will permit the jaws to separate sufficiently to admit the head of the fitting to the position shown in Fig. 2. Thereafter, the application of lubricant pressure will establish a gripping and sealing action as hereinbefore described.

After the lubricating operation has been completed, the lubricant pressure in the coupler is released and the coupler may be readily removed from the fitting by pulling backwardly on the discharge conduit D' or the adjacent end of the tubular member 60. In this form of my invention the flaring part 94 of the cylinder 74 does not constitute a camming means for removing the coupler from the fitting. Instead, the fitting-engaging ends of the jaws 68 are of such length that when the coupler is pivoted at a sufficient angle to the fitting, one of the jaws will engage the side of the fitting and produce a camming action whereby the coupler may be readily removed from the fitting even though some lubricant pressure remains in the coupler.

It will be noted that the sealing means provided by the coupler is in the form of a metallic or non-yielding concavely spherical sealing surface whereby a sealing connection is maintained between the lubricant receiving fitting and the coupler for all angular positions of the coupler relative to the axis of the fitting within the range of their cooperability. This is an extremely important feature in view of the modern tendency to locate lubricant receiving fittings in relatively inaccessible positions so that it is frequently not possible to reach these fittings by applying the coupler thereto in exact axial alignment with the fitting. The guiding means is effective to guide the coupler onto the fitting when the coupler is moved into engagement with the fitting at an angle to the axis thereof and such guiding means is so positioned and arranged that it does not interfere with attachment of the coupler to the fitting at any angle within the range of cooperability therebetween.

Attention is called to the fact that my novel couplers are of simple and sturdy construction and may be economically manufactured by conventional production methods and may be readily disassembled for inspection or repair. My invention is not limited to the embodiments shown but may assume numerous other forms and my invention comprehends all modifications, variations, and equivalents coming within the scope of the appended claims.

I claim:

1. A coupler of the class described, comprising a tubular member terminating at one end in a metallic, concavely spherical sealing surface and having its opposite end adapted for connection to a supply conduit, said member being provided with an annular groove, a plurality of fitting-engaging jaws fulcrumed adjacent one end in said groove whereby said jaws are confined longitudinally with respect to said member, said jaws having arcuate transversely rounded radially outwardly projecting surfaces adjacent the opposite end thereof, hydraulically actuated means for engaging said radial surfaces and causing said jaws to clamp a fitting and hold such fitting in sealing engagement with said sealing surface, and camming means provided adjacent the outer free end of each of said jaws adapted to engage the side of the fitting when the coupler is tilted about the axis of the fitting whereby the coupler may be readily removed from the fitting.

2. A coupler of the class described, comprising a tubular member having one end providing a concavely spherical sealing surface and the other end adapted for connection to a source of fluid-like material under pressure, said tubular member having an annular groove spaced from said sealing surface and an annular piston-like flange fixed with respect thereto intermediate said groove and the said other end of the tubular member, a plurality of jaws each having a part at one end engaged in said groove to limit longitudinal movement of said jaws relative to said member, a sleeve slidable relative to said member and engaging said piston-like flange, a head secured to said sleeve to provide a piston and cylinder construction, sealing means for preventing escape of lubricant between said member and said sleeve and said member and said head, and tapered jaw-engaging means attached to said cylinder adapted to cooperate with the free ends of said jaws for causing said jaws to grip a fitting.

3. A coupler of the class described, comprising a tubular member having one end providing an integral, concavely spherical sealing surface and the other end adapted for connection to a source of fluid-like material under pressure, said tubular member having an annular groove spaced from said sealing surface and an annular piston-like flange fixed with respect thereto intermediate said groove and the said other end of the tubular member, a plurality of jaws each having a part at one end engaged in said groove to limit longitudinal movement of said jaws relative to said member, a sleeve slidable relative to said member and engaging said piston-like flange to provide a piston and cylinder construction, a head secured to said sleeve, sealing means for preventing escape of lubricant between said member and said sleeve and said member and said head, tapered jaw-engaging means attached to said cylinder adapted to engage said jaws adjacent their free ends upon movement of said sleeve in response to the application of fluid under pressure to said coupler for causing said jaws to grip a fitting, and guiding means provided by said sleeve.

4. A coupler of the class described comprising a tubular member terminating at one end in a concavely spherical sealing surface and having its opposite end adapted for connection to a supply conduit, said member being provided with an annular groove, a plurality of jaws each having generally radially inturned projections at one end fulcrumed in said groove, a fitting engaging surface on the inner side of the opposite end thereof and transversely rounded radially extending projections on the outer side of the said opposite end, hydraulically actuated means including a sleevelike member surrounding said jaws and having a camming surface adjacent the outer end thereof, and piston forming means effective to move said sleevelike member and tubular member relatively longitudinally in response to the application of lubricant under pressure to the coupler to bring the camming surface on said sleevelike member and the radial projections on said jaws into camming engagement and cause the jaws to clamp said fitting.

5. A coupler for making detachable fluidtight connection with a lubricant receiving fitting having a generally spherical head and a neck tapered outwardly from the base of said head comprising a head having a tubular extension, nonyielding rounded sealing means integral with said extension, a sleeve attached to said head and surrounding said extension in spaced relation thereto, a plurality of jaws, cooperating means including means spaced from the sealing means on said extension and means on one end of said jaws fulcruming the latter to said tubular member for lateral rocking movement relative to the tubular member, said jaws having portions providing laterally projecting rounded surfaces axially spaced from the ends secured to said extension and a fitting engaging surface, said jaws together defining a generally frusto-conical shaped guiding surface on the inner sides of the said free ends thereof adapted to cooperate with the head of a fitting to guide the coupler thereon or to cooperate with the tapered neck of the fitting when the coupler is tilted about the axis of the fitting to cam the coupler from the fitting, and a piston located between said extension and sleeve, said piston having a skirt surrounding said jaws and including a tapered surface adapted to engage said laterally extending rounded surfaces upon movement of the piston produced by the application of fluid under pressure to said coupler.

ERNEST W. DAVIS.

REFERENCES CITED

The following references are of record in the file of this patent:

UNITED STATES PATENTS

| Number | Name | Date |
|---|---|---|
| 2,047,132 | Williams | July 7, 1936 |
| 2,061,086 | Nord | Nov. 17, 1936 |
| 2,396,499 | Fitch | Mar. 12, 1946 |
| 2,400,817 | Fox | May 21, 1946 |
| 2,438,750 | Hughs | Mar. 30, 1948 |